US012752271B2

(12) United States Patent
Mu et al.

(10) Patent No.: US 12,752,271 B2

(45) Date of Patent: Oct. 6, 2026

(54) GENE DETECTION SUBSTRATE, GENE DETECTION CHIP AND METHOD FOR PREPARING GENE DETECTION SAMPLE

(71) Applicant: BOE TECHNOLOGY GROUP CO., LTD., Beijing (CN)

(72) Inventors: Yunqing Mu, Beijing (CN); Haonan Liu, Beijing (CN); Zhukai Liu, Beijing (CN); Ding Ding, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 585 days.

(21) Appl. No.: 18/029,792

(22) PCT Filed: May 19, 2022

(86) PCT No.: PCT/CN2022/093764

§ 371 (c)(1),
(2) Date: Mar. 31, 2023

(87) PCT Pub. No.: WO2023/221023

PCT Pub. Date: Nov. 23, 2023

(65) Prior Publication Data

US 2024/0359174 A1 Oct. 31, 2024

(51) Int. Cl.
*B01L 3/00* (2006.01)

(52) U.S. Cl.
CPC ... *B01L 3/502707* (2013.01); *B01L 2200/025* (2013.01); *B01L 2200/12* (2013.01);
(Continued)

(58) Field of Classification Search
CPC ............. B01L 3/5027; B01L 3/502746; B01L 3/502753; B01L 3/50276; B01L 2200/12;
(Continued)

(56) References Cited

U.S. PATENT DOCUMENTS

2004/0018116 A1* 1/2004 Desmond .......... B01L 3/502715 422/502
2019/0217298 A1 7/2019 Yamana et al.
2022/0168741 A1* 6/2022 Hama .................. B01L 3/5023

FOREIGN PATENT DOCUMENTS

CN 110437978 A 11/2019
CN 111601661 A 8/2020
(Continued)

OTHER PUBLICATIONS

China Patent Office, First Office Action, Aug. 14, 2026, for corresponding CN application No. 202280001263.7.

*Primary Examiner* — Charles Capozzi
*Assistant Examiner* — Dwayne K Handy
(74) *Attorney, Agent, or Firm* — HOUTTEMAN LAW LLC

(57) ABSTRACT

A gene detection substrate is provided, including: a substrate; a gene detection channel in the substrate, an opening of the gene detection channel is on one side of the substrate; the gene detection channel includes a sample injection groove, a sample outgoing groove and a flow channel groove sequentially connected and communicated with each other; the flow channel groove includes reaction holes and flow channel structures; the reaction holes are distributed at intervals, and any two adjacent reaction holes are communicated with each other through the flow channel structure; the flow channel structure includes a first, second, and third sub-grooves sequentially connected and communicated with each other; a width of each of the first and third sub-grooves in a first direction is smaller than that of the second sub-groove in the first direction; and the first direction is perpendicular to an arrangement direction of two adjacent reaction holes.

20 Claims, 4 Drawing Sheets

(52) U.S. Cl.
CPC ....... *B01L 2200/16* (2013.01); *B01L 2300/12* (2013.01); *B01L 2300/161* (2013.01)

(58) Field of Classification Search
CPC ....... B01L 2300/161; B01L 2300/0864; B01L 2300/0877; B01L 2300/12
See application file for complete search history.

(56) References Cited

FOREIGN PATENT DOCUMENTS

| | | | |
|---|---|---|---|
| CN | 111763612 | A | 10/2020 |
| CN | 215757346 | U | 2/2022 |
| CN | 114364786 | A | 4/2022 |
| JP | 2006078475 | A | 3/2006 |
| JP | 2006223126 | A | 8/2006 |
| JP | 2007136322 | A | 6/2007 |
| JP | 2011211946 | A | 10/2011 |
| JP | 2013051958 | A | 3/2013 |
| WO | WO2021038996 | A1 | 3/2021 |

* cited by examiner

GENE DETECTION SUBSTRATE, GENE DETECTION CHIP AND METHOD FOR PREPARING GENE DETECTION SAMPLE

CROSS REFERENCE TO RELATED APPLICATION

This is a National Phase Application filed under 35 U.S.C. 371 as a national stage of PCT/CN2022/093764, filed on May 19, 2022, the contents of which are incorporated herein in their entirety by reference.

TECHNICAL FIELD

The present disclosure relates to the field of biomedicine technology, in particular to a gene detection substrate, a gene detection chip and a method for preparing a gene detection sample.

BACKGROUND

Polymerase chain reaction (PCR) is a molecular biology technique for amplifying and copying specific segments of deoxyribonucleic acid (DNA), and may be regarded as special DNA replication in vitro, and the PCR has the most outstanding characteristic of greatly increasing a trace of DNA.

DNA is a deoxyribonucleic acid, which is one of the four types of biomacromolecules contained in biological cells, carries the gene information necessary for the synthesis of RNA and protein, and is a biomacromolecule essential for the development and normal operation of the organisms. RNA (ribonucleic acid) is a gene information carrier present in biological cells and in parts of viruses and viroids.

Since the PCR technology has been developed, the PCR technology goes through development processes from a qualitative PCR detection by an end point method to a relative quantitative PCR detection by real-time fluorescence, and then to an absolute quantitative digital PCR detection.

SUMMARY

The embodiment of the present disclosure provides a gene detection substrate, a gene detection chip and a method for preparing a gene detection sample.

In a first aspect, an embodiment of the present disclosure provides a gene detection substrate, including: a substrate; a gene detection channel in the substrate, wherein an opening of the gene detection channel is on a side of the substrate; the gene detection channel includes a sample injection groove, a sample outgoing groove and a flow channel groove, the sample injection groove, the flow channel groove and the sample outgoing groove are sequentially connected to each other and communicated with each other; the flow channel groove includes a plurality of reaction holes and a plurality of flow channel structures; the plurality of reaction holes are distributed at intervals, and any two adjacent reaction holes are communicated with each other through the flow channel structure; the flow channel structure includes a first sub-groove, a second sub-groove and a third sub-groove, the first sub-groove, the second sub-groove and the third sub-groove are sequentially connected to each other and communicated with each other; a width of each of the first and third sub-grooves in a first direction is smaller than a width of the second sub-groove in the first direction; and the first direction is perpendicular to an arrangement direction of two adjacent reaction holes.

In some embodiments, a depth of each of the first and third sub-grooves is greater than a depth of the second sub-groove; and the depths of the first, second, and third sub-grooves are respective sizes of the first, second, and third sub-grooves in a thickness direction of the substrate.

In some embodiments, the width of the second sub-groove in the first direction is smaller than a width of the reaction hole in the first direction.

In some embodiments, the widths of the first and third sub-grooves in the first direction are the same.

In some embodiments, the depth of each of the first sub-groove and the third sub-groove is equal to a depth of the reaction hole; and the depth of the reaction hole is a size of the reaction hole in the thickness direction of the substrate.

In some embodiments, the plurality of reaction holes and the plurality of flow channel structures are arranged along a second direction; the second direction is perpendicular to the first direction; the flow channel groove further includes a first end close to the sample injection groove and a second end close to the sample outgoing groove, and the flow channel groove further includes a first branch groove and a second branch groove; the first branch groove is connected between the sample injection groove and a first reaction hole at the first end, and the sample injection groove is communicated with the first reaction hole through the first branch groove; the second branch groove is connected between the sample outgoing groove and a second reaction hole at the second end; the first sub-groove and the second sub-groove are further connected between the second branch groove and the second reaction hole; the second reaction hole, the first sub-groove, the second sub-groove and the second branch groove are sequentially arranged along the second direction; and the sample outgoing groove is communicated with the second reaction hole through the second branch groove, the second sub-groove, and the first sub-groove.

In some embodiments, a shape of an orthographic projection of the reaction hole on the substrate includes a circle; and a shape of an orthographic projection of each of the first, second, and third sub-grooves on the substrate includes a rectangle.

In some embodiments, a diameter of the orthographic projection of the reaction hole on the substrate is in a range of 68 μm to 88 μm; a depth of the reaction hole is in a range of 70 μm to 90 μm; and a depth of the second sub-groove is in a range of 20 μm to 40 μm.

In some embodiments, a width of the first sub-groove in the first direction is in a range from 20 μm to 30 μm; a width of the third sub-groove in the first direction is in a range from 20 μm to 30 μm; and a width of the second sub-groove in the first direction is in a range from 35 μm to 45 μm.

In some embodiments, a length of the first sub-groove in the second direction is in a range from 10 μm to 20 μm; a length of the third sub-groove in the second direction is in a range from 10 μm to 20 μm; and a length of the second sub-groove in the second direction is in a range from 25 μm to 35 μm.

In some embodiments, a depth of each of the sample injection groove, the sample outgoing groove, the first branch groove, and the second branch groove is the same as a depth of the second sub-groove; and the depth of each of the sample injection groove, the sample outgoing groove, the first branch groove and the second branch groove is a size thereof along a thickness direction of the substrate In some embodiments, the flow channel groove includes a plurality of flow channel grooves; the plurality of flow channel grooves are arranged in parallel with each other; and orthographic projections of the reaction holes in any two adjacent flow channel grooves on straight lines extending in the second direction are staggered distributed.

In some embodiments, the reaction holes in each flow channel groove are arranged at equal intervals; and the reaction holes in the plurality of flow channel grooves are arranged in an array.

In some embodiments, the side of the substrate from which the opening of the gene detection channel is formed comprises a first surface and a second surface; the first surface is an inner wall of the gene detection channel, and a hydrophilic layer is provided on the first surface; and a hydrophobic layer is provided on the second surface.

In some embodiments, the substrate is made of any one of polydimethylsiloxane, polymethyl methacrylate, and polycarbonate.

In a second aspect, an embodiment of the present disclosure further provides a gene detection chip, which includes the gene detection substrate.

In some embodiments, the gene detection chip further includes an encapsulation film, wherein the encapsulation film and the gene detection substrate are aligned and assembled, so as to encapsulate the gene detection channel in the gene detection substrate; and a region of the encapsulation film corresponding to the second sub-groove in the gene detection channel is attached and connected to an inner wall of the second sub-groove.

In some embodiments, the encapsulation film includes a double-sided adhesive film or an ultraviolet curing adhesive film.

In some embodiments, the gene detection chip further includes a plurality of the gene detection substrates, wherein the plurality of gene detection substrates are spliced together, and the gene detection channels in the plurality of gene detection substrates are separated from each other.

In a third aspect, an embodiment of the present disclosure further provides a method for preparing a gene detection sample, including: preparing a gene detection substrate; aligning and assembling an encapsulation film and the gene detection substrate, to form a gene detection chip; injecting a sample reagent into a sample injection groove of a gene detection channel in the gene detection chip; and attaching and connecting a region of the encapsulation film corresponding to a second sub-groove in the gene detection channel to an inner wall of the second sub-groove when the gene detection channel is filled with the sample reagent.

In some embodiments, the preparing the gene detection substrate includes; preparing the gene detection channel on the substrate through a patterning process.

BRIEF DESCRIPTION OF DRAWINGS

The accompanying drawings, which are provided for further understanding of embodiments of the present disclosure and constitute a part of this specification, are for explaining the present disclosure together with the embodiments of the present disclosure, but are not intended to limit the present disclosure. The above and other features and advantages will become more apparent to ordinary skill in the art by describing in detail example embodiments thereof with reference to the drawings. In the drawings.

DETAIL DESCRIPTION OF EMBODIMENTS

Figure 1:
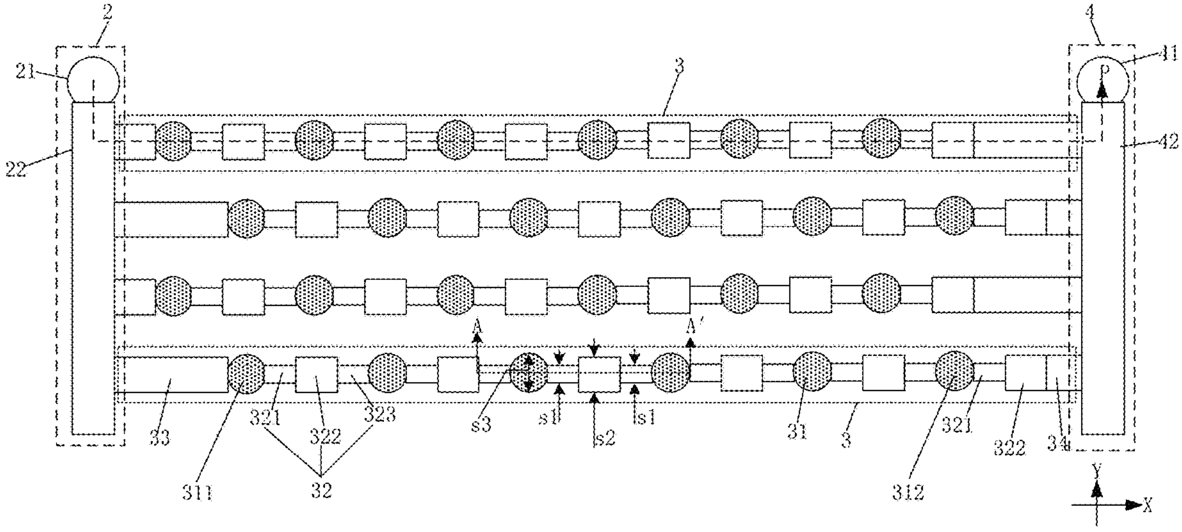
FIG. 1 is a schematic top view of a partial structure of a gene detection substrate according to an embodiment of the present disclosure.

In order to enable one of ordinary skill in the art to better understand the technical solutions of the embodiments of the present disclosure, a gene detection substrate, a gene detection chip and a method for preparing a gene detection sample according to an embodiment of the present disclosure will be described in further detail with reference to the accompanying drawings and the detailed description.

The embodiments of the present disclosure will be described more fully hereinafter with reference to the accompanying drawings, but the embodiments shown may be embodied in different forms and should not be construed as limited to the embodiments set forth herein. Rather, these embodiments are provided so that the present disclosure will be thorough and complete, and will fully convey the scope of the present disclosure to one ordinary skill in the art.

The embodiments of the present disclosure are not limited to the embodiments shown in the drawings, but include modifications of configurations formed based on a manufacturing process. Thus, areas illustrated in the drawings have schematic properties, and shapes of the areas shown in the drawings illustrate specific shapes of the areas, but are not intended to be restrictive.

In the related art, the digital PCR detection is to distribute DNA or RNA samples in a large number of micro-reaction units, and then to perform a single-molecule template PCR copying, a fluorescence detection and a statistical analysis on target sequences (namely, target sequences of the samples) in the large number of micro-reaction units, to realize the absolute quantification; an original concentration of the DNA or RNA samples in the samples is directly detected independent of a standard curve and multiple gradient standards having a known concentration. Such the detection mode has more excellent sensitivity and accuracy than the traditional fluorescent quantitative PCR detection, so that the digital PCR detection rapidly gets a wide attention, and the advantages exhibited in the aspects of a trace (namely tiny) nucleic acid sample detection, a rare mutation detection under a complex background, a nucleic acid copy number variation and an identification for a tiny difference of gene expression amounts are generally accepted.

A PCR instrument manufactured based on the polymerase is actually a temperature control device which can well control a denaturation temperature, a renaturation temperature and an extended temperature. A microfluidic chip is one type of the PCR instrument manufactured based on the polymerase.

The microfluidic chip technology is a scientific technology mainly characterized by the manipulation of fluid in a micron-scale space, and has the capability of scaling down the basic functions of laboratories for biology, chemistry, or the like to a chip of several square centimeters. Therefore, the microfluidic chip technology is also called lab-on-a-chip. In the related art, in the microfluidic chip in the mainstream form, a network is formed mostly by micro-channels, so that a controllable fluid can pass through the whole system, to realize various functions of a conventional chemical or biological laboratory or the like.

The appearance of the microfluidic chip causes the digital PCR detection application to be more convenient. The good compatibility and flexibility can be realized by using the digital PCR detection method and a reagent on the microfluidic chip. For example, on each chip, the PCR reagent is divided into hundreds of independent reaction units in the nanoliter order for the digital PCR analysis, so that the sensitivity and the accuracy of the detection are improved.

In the related art, in the microfluidic chip, sample injection detection for a sample solution is implemented through sample detection channels formed by etching and processing on a substrate. The sample detection channels includes a sample injection channel, a sample outgoing channel and a plurality of micro-reaction units (such as micro-reaction holes) connected between the sample injection channel and the sample outgoing channel, and every two adjacent micro-reaction units are connected to each other through rectangular channel structures with a same depth and a same width; when each micro-reaction unit is filled with the sample solution, the sample detection channels are encapsulated through an encapsulation film, so that the micro-reaction units are isolated from each other to form micro-chambers independent of each other, thereby performing statistic analysis on samples in each micro-reaction unit.

However, due to its small volume, high fabricating difficulty and the like, the microfluidic chip with the structure in the related art has the problems that the sample injection into the micro-reaction holes is insufficient, bubbles are left in the micro-reaction holes, the packaging effect between the adjacent micro-reaction holes after the sample injection is poor. Therefore, connection channels between the adjacent micro-reaction holes cannot be well separated from each other, resulting in that cross contamination of reagents and samples between the micro-reaction holes is caused, the detection effect is influenced, the precision and the accuracy of a detection result are reduced.

Figure 2:
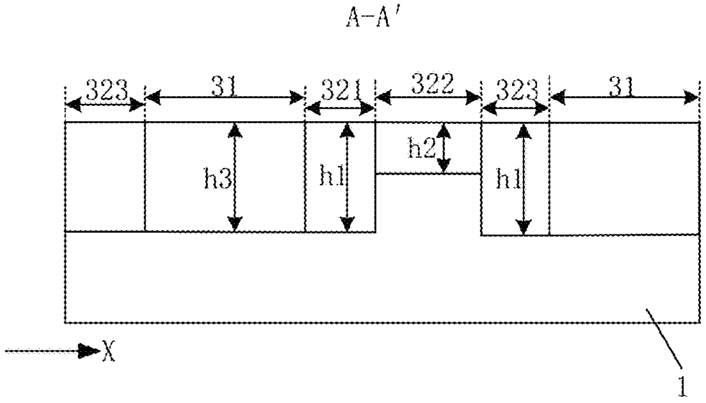
FIG. 2 is a cross-sectional view of a structure taken along a line AA' in FIG. 1.
Figure 3:
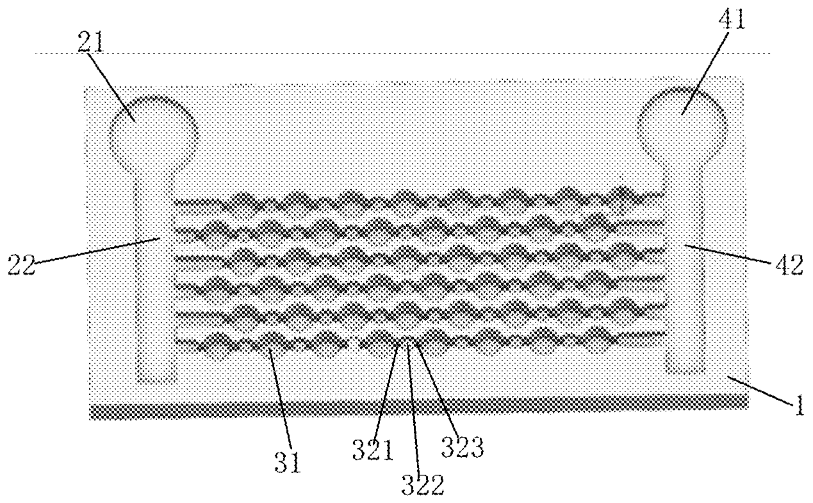
FIG. 3 is a schematic perspective view of a partial structure of a gene detection substrate according to an embodiment of the present disclosure.

In view of the above problems, in a first aspect, an embodiment of the present disclosure provides a gene detection substrate. FIG. 1 is a schematic top view of a partial structure of a gene detection substrate according to an embodiment of the present disclosure. FIG. 2 is a cross-sectional view of a structure taken along a line AA' in FIG. 1. FIG. 3 is a schematic perspective view of a partial structure of a gene detection substrate according to an embodiment of the present disclosure. Referring to FIG. 1, the gene detection substrate includes; a substrate 1; a gene detection channel formed in the substrate 1, wherein the gene detection channel is formed at one side of the substrate 1; the gene detection channel includes a sample injection groove 2, a sample outgoing groove 4 and flow channel grooves 3, wherein the sample injection groove 2, the flow channel grooves 3 and the sample outgoing groove 4 are sequentially connected to each other and communicated with each other; each flow channel groove 3 includes a plurality of reaction holes 31 and a plurality of flow channel structures 32; the plurality of reaction holes 31 are distributed at intervals, and any two adjacent reaction holes 31 are communicated with each other through a corresponding flow channel structure 32; each flow channel structure 32 includes a first sub-groove 321, a second sub-groove 322 and a third sub-groove 323, the first sub-groove 321, the second sub-groove 322 and the third sub-groove 323 are sequentially connected to each other and communicated with each other; a width s1 of each of the first and third sub-grooves 321 and 323 in a first direction Y are smaller than a width s2 of the second sub-groove 322 in the first direction Y; the first direction Y is perpendicular to an arrangement direction of two adjacent reaction holes 31.

The gene detection substrate may be used for detecting biological samples such as DNA (deoxyribonucleic acid) samples and RNA (ribonucleic acid) samples. The DNA or RNA samples are distributed in a large number of the reaction holes 31, and then a single-molecule template PCR (polymerase chain reaction) copying, a fluorescence detection and a statistical analysis are performed on target sequences (namely, target sequences of the samples) in the large number of the reaction holes 31, to realize the absolute quantification, and thus an original concentration of the DNA or RNA samples in the samples is directly detected independent of a standard curve and multiple gradient standards having a known concentration.

In some embodiments, the widths of the first, second, and third sub-grooves 321, 322, and 323 in the first direction Y are sizes of their respective opening in the first direction Y, respectively.

In some embodiments, referring to FIG. 1, the width s2 of the second sub-groove 322 in the first direction Y is smaller than a width s3 of the reaction hole 31 in the first direction Y. The width of the reaction hole 31 in the first direction Y is a size of an aperture of the reaction hole 31 in the first direction Y.

In some embodiments, referring to FIG. 1, the widths s1 of the first and third sub-grooves 321 and 323 in the first direction Y are equal to each other.

In some embodiments, referring to FIG. 2, a depth h1 of each of the first and third sub-grooves 321 and 323 is greater than a depth h2 of the second sub-groove 322; the depths of the first, second, and third sub-grooves 321, 322, and 323 are their sizes in a thickness direction of the substrate 1, respectively. The depth of each of the first sub-groove 321, the second sub-groove 322 and the third sub-groove 323 is a size from a surface, where a bottom of each of the first sub-groove 321, the second sub-groove 322 and the third sub-groove 323 is located, to a surface, where a top of each of the first sub-groove 321, the second sub-groove 322 and the third sub-groove 323 is located, that is, a depth of each of the first sub-groove 321, the second sub-groove 322 and the third sub-groove 323 into the substrate 1. In some embodiments, the substrate 1 is a flat plate with a uniform thickness.

In some embodiments, the depth of each of the first sub-groove 321 and the third sub-groove 323 is equal to the depth h3 of the reaction hole 31; the depth of the reaction hole 31 is a size of the reaction hole 31 in the thickness direction of the substrate 1.

In this embodiment, referring to FIG. 1, in a flow path P of the biological sample to be detected in the gene detection channel, when the gene detection channel detects the biological sample (usually a sample solution) to be detected, the biological sample to be detected is input into the sample injection groove 2; under the action of pressure, the biological sample to be detected flows into the flow channel grooves 3 from the sample injection groove 2; after the flow channel grooves 3 is filled with the biological sample to be detected, the biological sample flows into the sample outgoing groove 4; that is, the gene detection channel can realize the continuous sample injection of the biological sample to be detected. Subsequently, when the sample injection of the biological sample to be detected is finished, the gene detection channel is encapsulated by using an encapsulation film. Each second sub-groove 322 serves as a separating region for separating the reaction holes 31 in the subsequent encapsulation. For example, a wall of the second sub-groove 322 is adhered to the corresponding region of the encapsulation film by a film pressing method, so as to separate the flow channels and separate the reaction holes 31 from each other. Meanwhile, after the encapsulation is finished, the first sub-groove 321, the third sub-groove 323 and the reaction hole 31 collectively serve as a reaction region, that is, the first sub-groove 321 and the third sub-groove 323 serves complementary reaction regions of the reaction hole 31; compared with the scheme that only the micro reaction holes are used as the reaction chambers in the prior art, a volume of the reaction region is increased, and the proper increase in the volume of the reaction regions is beneficial to the implementation and detection of digital polymerase chain reaction (namely, dPCR reaction), so that the effectiveness of the gene detection substrate is improved.

In this embodiment, the widths of the first sub-groove 321, the second sub-groove 322, and the third sub-groove 323 in the first direction Y are designed to be narrow-wide-narrow, and the depths of the first sub-groove 321, the second sub-groove 322, and the third sub-groove 323 are designed to be deep-shallow-deep, so that on one hand, the sample injection efficiency of each reaction hole 31 in the gene detection substrate can be ensured, and the encapsulation effect of each reaction hole 31 after the sample injection is improved, thereby sufficiently separating the reaction holes 31 from each other, and improving the encapsulation effectiveness between the reaction holes 31; on the other hand, the volume of the reaction hole 31 can be increased, that is, the volume of available reaction region can be increased, thereby improving the accuracy and precision of the gene detection; in addition, the gene detection channel has a relatively simple structural design, is easy to process, is convenient to encapsulate, thereby improving the encapsulating speed and efficiency.

In some embodiments, referring to FIG. 1, the plurality of reaction holes 31 and the plurality of flow channel structures 32 are arranged along a second direction X; the second direction X is perpendicular to the first direction Y; each flow channel groove 3 further includes a first end close to the sample injection groove 2 and a second end close to the sample outgoing groove 4, and further includes a first branch groove 33 and a second branch groove 34; the first branch groove 33 is connected between the sample injection groove 2 and a first reaction hole 311 positioned at the first end, and communicates the sample injection groove 2 with the first reaction hole 311; the second branch groove 34 is connected between the sample outgoing groove 4 and a second reaction hole 312 at the second end; the first sub-groove 321 and the second sub-groove 322 are further connected between the second branch groove 34 and the second reaction hole 312; the second reaction hole 312, the first sub-groove 321, the second sub-groove 322 and the second branch groove 34 are sequentially arranged along the second direction X; the sample outgoing groove 4 is communicated with the second reaction hole 312 through the second branch groove 34, the second sub-groove 322, and the first sub-groove 321.

The first sub-groove 321 and the second sub-groove 322 are arranged between the second reaction hole 312 and the second sub-groove 34, so that the second reaction hole 312 and the second branch groove 34 can be effectively separated from each other by the second sub-groove 322 when encapsulating the gene detection channel after the sample injection is finished, and the second reaction hole 312 can be independently encapsulated.

In some embodiments, referring to FIG. 1, a shape of an orthographic projection of the reaction hole 31 on the substrate 1 includes a circle; each of shapes of orthographic projections of the first, second and third sub-grooves 321, 322 and 323 on the substrate 1 includes a rectangle.

In some embodiments, a cross-sectional shape of the reaction hole 31 in a plane perpendicular to the second direction X is a rectangle with an opening on one side or an inverted trapezoid with an opening on one side, and the specific shape is a shape that can be realized through an actual manufacturing process (e.g., a patterning process). A cross-sectional shape of each of the first sub-groove 321, the second sub-groove 322, and the third sub-groove 323 in a plane perpendicular to the second direction X is a rectangle with an opening on one side or an inverted trapezoid with an opening on one side, and the specific shape is a shape that can be realized through an actual manufacturing process (e.g., a patterning process).

In some embodiments, a diameter of the orthographic projection of the reaction hole 31 on the substrate 1 is in a range of 68 μm to 88 μm; a depth of the reaction hole 31 is in a range of 70 μm to 90 μm; a depth of the second sub-groove 322 is in a range of 20 μm to 40 μm.

In some embodiments, the diameter of the orthographic projection of the reaction hole 31 on the substrate 1 is 78 μm; the depth of the reaction hole 31 is 80 μm; the depth of the second sub-groove 322 is 30 μm.

In some embodiments, a width of the first sub-groove 321 in the first direction Y is in a range from 20 μm to 30 μm; a width of the third sub-groove 323 in the first direction Y is in a range from 20 μm to 30 μm; a width of the second sub-groove 322 in the first direction Y is in a range from 35 μm to 45 μm.

In some embodiments, the width of the first sub-groove 321 in the first direction Y is 25 μm; the width of the third sub-groove 323 in the first direction Y is 25 μm; the width of the second sub-groove 322 in the first direction Y is 40 μm. With such the size, the first sub-groove 321 and the third sub-groove 323 with narrower widths are located at the two ends of the second sub-groove 322; the first sub-groove 321 and the third sub-groove 323 with narrower widths, instead of the second sub-groove 322 with a wider width, are directly connected to the reaction hole 31 with a larger diameter. In this way, in the actual encapsulation process, an inner wall of the second sub-groove 321 with a wider width can be attached and closely connected to the encapsulation film, so that the liquid leakage in a region where the encapsulated second sub-groove 322 is located is reduced, thereby avoiding the crosstalk in the biological sample to be detected between two adjacent reaction holes 31 in the detection process, and improving the precision and the accuracy of the detection.

In some embodiments, a length of the first sub-groove 321 in the second direction X is in a range from 10 μm to 20 μm; a length of the third sub-groove 323 in the second direction X is in a range from 10 μm to 20 μm; a length of the second sub-groove 322 in the second direction X is in a range from 25 μm to 35 μm.

In some embodiments, the length of the first sub-groove 321 in the second direction X is 15 μm; the length of the third sub-groove 323 in the second direction X is 15 μm; the length of the second sub-groove 322 in the second direction X is 32 μm. In some embodiments, a distance between centers of orthographic projections of any two adjacent reaction holes 31 arranged along the second direction X on the substrate 1 is 140 μm.

Figure 4:
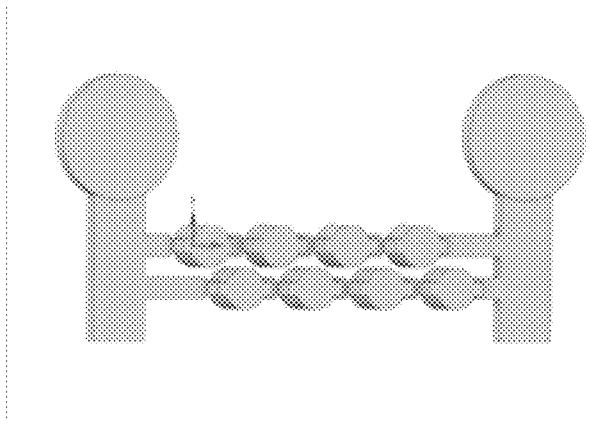
FIG. 4 is a schematic diagram of a three-dimensional structure of a portion of a local fluid sample in a gene detection substrate according to an embodiment of the present disclosure.

In some embodiments, a depth of each of the sample injection groove 2, the sample outgoing groove 4, the first branch groove 33, and the second branch groove 34 is the same as the depth of the second sub-groove 322; the depth of each of the sample injection groove 2, the sample outgoing groove 4, the first branch groove 33 and the second branch groove 34 is a size thereof along the thickness direction of the substrate 1. Referring to FIG. 4, FIG. 4 is a schematic diagram of a three-dimensional structure of a portion of a local fluid sample in a gene detection substrate according to an embodiment of the present disclosure. With such arrangement, the sample injection efficiency of the gene detection channel can be improved, the reaction hole 31 can be fully filled, no bubble is generated in the reaction hole 31, and the effectiveness of the sample injection of the gene detection channel and the air exhausting of the reaction hole 31 is improved.

In some embodiments, a plurality of flow channel grooves 3 are provided; the plurality of flow channel grooves 3 are arranged in parallel with each other; orthographic projections of the reaction holes 31 in any two adjacent flow channel grooves 3 on straight lines extending in the second direction X are staggered distributed. With this arrangement, an area of the substrate 1 can be sufficiently utilized when the reaction holes 31 are distributed, so that a greater number of reaction holes 31 are distributed on the effective utilization area of the substrate 1, thereby improving the utilization rate of the substrate 1.

In some embodiments, the reaction holes 31 in each flow channel groove 3 are arranged at equal intervals; the reaction holes 31 in the plurality of flow channel grooves 3 are arranged in an array. With this arrangement, a greater number of reaction holes 31 are distributed on the effective utilization area of the substrate 1, thereby improving the utilization rate of the substrate 1 and the accuracy and the precision of the gene detection.

In some embodiments, the sample injection groove 2 includes a sample injection hole 21 and a sample injection sub-groove 22, the sample injection hole 21 is located at one end of the sample injection sub-groove 22, and the sample injection hole 21 and the sample injection sub-groove 22 are communicated with each other. The sample outgoing groove 4 includes a sample outgoing hole 41 and a sample outgoing sub-groove 42, the sample outgoing hole 41 is located at one end of the sample outgoing sub-groove 42, and the sample outgoing hole 41 is communicated with the sample outgoing sub-groove 42. The plurality of flow channel grooves 3 are respectively connected between the sample injection sub-groove 22 and the sample outgoing sub-groove 42 and are communicated with the sample injection sub-groove 22 and the sample outgoing sub-groove 42. The sample injection sub-groove 22 and the sample outgoing sub-groove 42 extend along the first direction Y, respectively. A width of each of the sample injection sub-groove 22 and the sample outgoing sub-groove 42 along the second direction X is larger than the maximum width of the flow channel groove 3 in the first direction Y. Shapes of orthographic projections of the sample injection hole 21 and the sample outgoing hole 41 on the substrate 1 each are a circle, and a diameter of the circle is larger than the maximum width of the flow channel groove 3 in the first direction Y. Referring to FIG. 3, with such arrangement, the sample injection efficiency of the gene detection channel can be improved, the reaction hole 31 can be fully filled, no bubble is generated in the reaction hole 31, and the effectiveness of the sample injection of the gene detection channel and the air exhausting of the reaction hole 31 is improved.

In some embodiments, the surface of the substrate 1 from which the gene detection channel is formed includes a first surface and a second surface; the first surface is an inner wall of the gene detection channel, and a hydrophilic layer is provided on the first surface; and a hydrophobic layer is provided on the second surface. That is, the hydrophobic layer is provided on a portion of the surface of the substrate 1 except a portion in which the gene detection channel is provided. In this embodiment, the hydrophobic layer is provided on a surface of a region of the substrate 1 in which the gene detection channel is not provided. The length, width and depth of each of the reaction hole 31, the first sub-groove 321, the second sub-groove 322 and the third sub-groove 323 all have the size in the micrometer order. In this way, the biological sample solution to be detected can be accurately loaded to the reaction holes 31 by means of the capillary force and the surface tension, which can help the biological sample solution to be detected to flow into the reaction holes 31, thereby avoiding the waste of the biological sample solution to be detected.

In some embodiments, the substrate 1 is made of any one of polydimethylsiloxane (PDMS), polymethyl methacrylate (PMMA), and polycarbonate (PC plastic). The gene detection channel is formed in the substrate 1 through exposure and development, so that the preparation process is simple and the mass production can be realized.

According to the gene detection substrate provided by the embodiment of the present disclosure, the widths of the first sub-groove, the second sub-groove, and the third sub-groove in the first direction are designed to be narrow-wide-narrow, and the depths of the first sub-groove, the second sub-groove, and the third sub-groove are designed to be deep-shallow-deep, so that on one hand, the sample injection efficiency of each reaction hole in the gene detection substrate can be ensured, and the encapsulation effect of each reaction hole after the sample injection is improved, thereby sufficiently separating the reaction holes from each other, and improving the encapsulation effectiveness between the reaction holes; on the other hand, the volume of the reaction hole can be increased, that is, the volume of available reaction region can be increased, thereby improving the accuracy and precision of the gene detection; in addition, the gene detection channel has a relatively simple structural design, is easy to process, is convenient to encapsulate, thereby improving the encapsulating speed and efficiency.

In a second aspect, embodiments of the present disclosure further provide a gene detection chip, wherein the gene detection chip includes the gene detection substrate in the foregoing embodiments.

Figure 5:
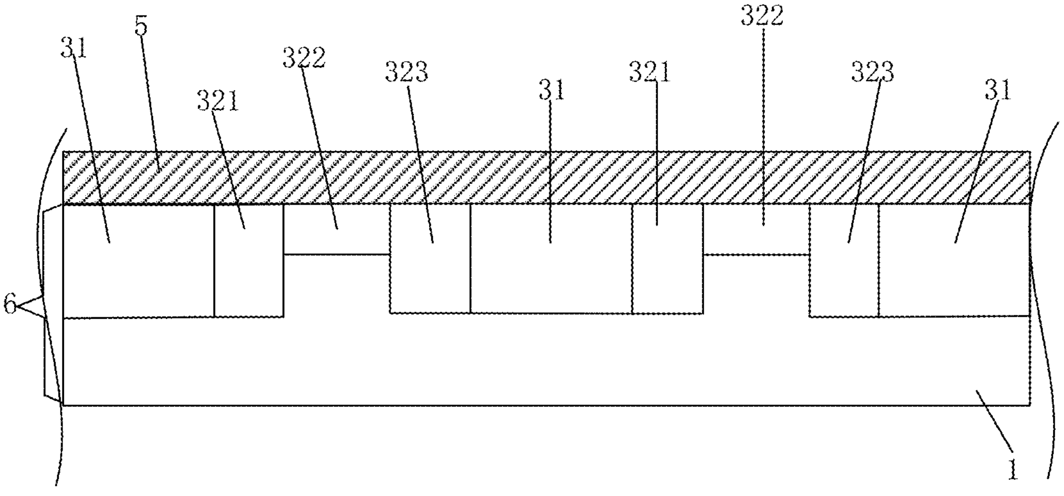
FIG. 5 is a schematic cross-sectional view of a structure of a gene detection chip according to an embodiment of the present disclosure.

In some embodiments, FIG. 5 is a schematic cross-sectional view of a structure of a gene detection chip according to an embodiment of the present disclosure. Referring to FIG. 5, the gene detection chip further includes the encapsulation film 5, the encapsulation film 5 and the gene detection substrate 6 are aligned and assembled, so as to encapsulate the gene detection channel in the gene detection substrate 6; a region of the encapsulation film 5 corresponding to the second sub-groove 322 in the gene detection channel may be attached and connected to the inner wall of the second sub-groove 322. In this way, the adjacent reaction holes 31 in the gene detection channel can be separated from each other, and each reaction hole 31 can be formed as an independent reaction chamber for gene detection, statistics and analysis.

In some embodiments, the encapsulation film 5 includes a double-sided adhesive film or an ultraviolet curing adhesive film. A film on one side of the double-sided adhesive film or the ultraviolet curing adhesive film containing the adhesive is adhered to the inner wall of the second sub-groove 322, thereby separating the flow channel and separating the reaction holes 31 from each other. The adhesive film is adopted, so that the encapsulation film 5 is attached and closely connected to the corresponding surface of the second sub-groove 322, and thus, the liquid leakage in the encapsulated region is reduced, thereby avoiding the cross-talk between the reaction holes 31. The encapsulation film 5 may be adhered to the inner wall of the second sub-groove 322 by a film pressing method.

Figure 6:
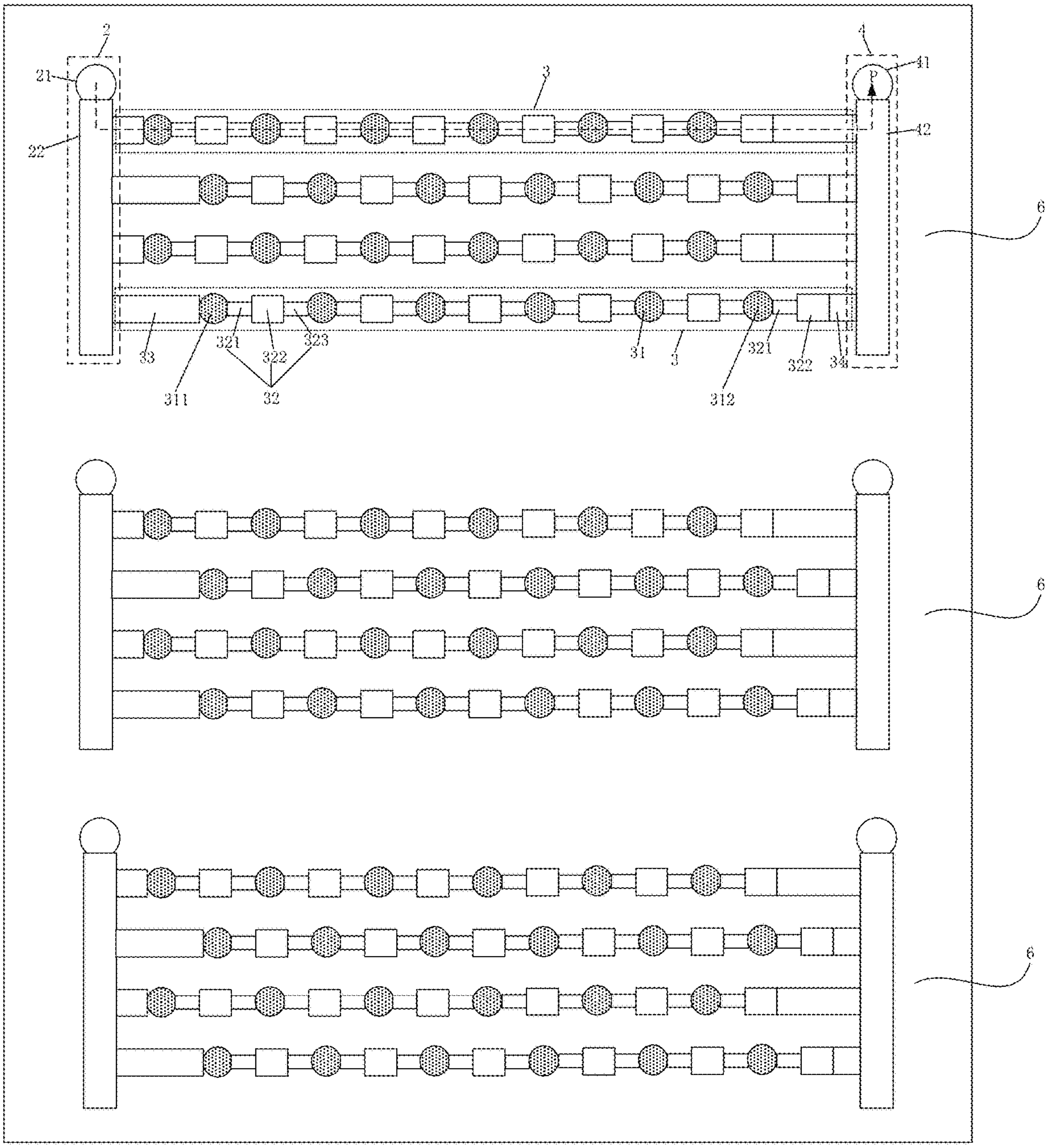
FIG. 6 is a schematic top view of a partial structure of a gene detection chip according to an embodiment of the present disclosure.

In some embodiments, FIG. 6 is a schematic top view of a partial structure of a gene detection chip according to an embodiment of the present disclosure. Referring to FIG. 6, the gene detection chip includes a plurality of gene detection substrates 6, the plurality of gene detection substrates 6 are spliced together, and gene detection channels in the plurality of gene detection substrates 6 are separated from each other.

Each gene detection substrate 6 is used for analyzing one biological sample to be detected, and the plurality of gene detection substrates 6 may be used for analyzing different biological samples to be detected, respectively, so that a plurality of biological samples to be detected are analyzed simultaneously on one gene detection chip, thereby improving a flux for the gene detection of the gene detection chip.

According to the gene detection chip provided by the embodiment of the present disclosure, by adopting the above gene detection substrate, on one hand, the sample injection efficiency of each reaction hole in the gene detection substrate can be ensured, and the encapsulation effect of each reaction hole after the sample injection is improved, thereby sufficiently separating the reaction holes from each other, and improving the encapsulation effectiveness between the reaction holes; on the other hand, the volume of the reaction hole can be increased, that is, the volume of available reaction region can be increased, thereby improving the accuracy and precision of the gene detection.

In a third aspect, an embodiment of the present disclosure further provides a method for preparing a gene detection sample, which includes; Step S01 to Step S04.

Step S01 includes preparing a gene detection substrate.

In the step, a gene detection channel is prepared on a substrate through a patterning process. The gene detection channel may be prepared on the substrate through exposure and development processes.

Step S02 includes aligning and assembling the encapsulation film and the gene detection substrate, to form the gene detection chip.

In this step, the encapsulation film covers the side of the substrate where the gene detection channel is located.

Step S03 includes injecting sample reagent into the sample injection groove of the gene detection channel in the gene detection chip.

In this step, the sample reagent is injected into the sample injection hole of the sample injection groove by a pouring or dripping method. The sample reagent is typically in a liquid state.

Step S04 includes attaching and connecting a region of the encapsulation film corresponding to the second sub-groove in the gene detection channel to the inner wall of the second sub-groove when the gene detection channel is filled with the sample reagent.

In the step, the encapsulation film may be adhered to the inner wall of the second sub-groove by a film pressing method.

Figure 7:
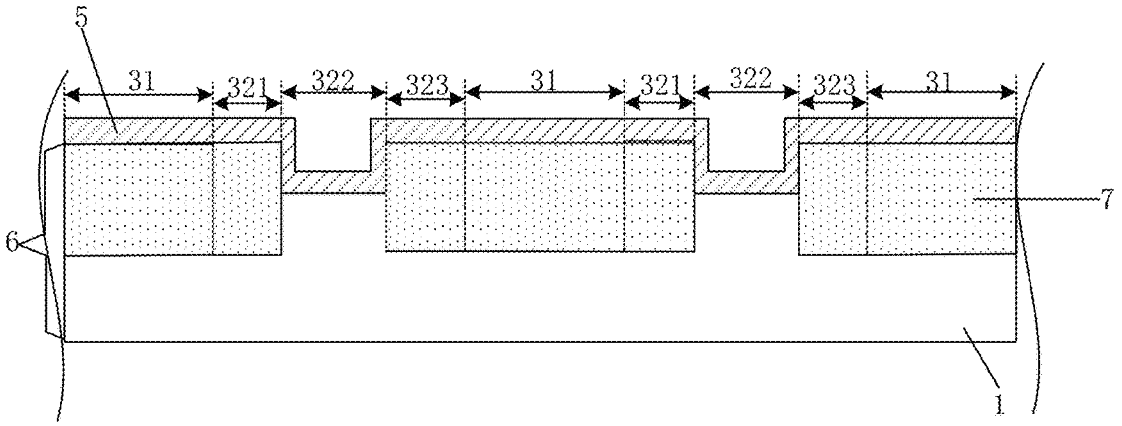
FIG. 7 is a schematic cross-sectional view of a partial structure of a prepared gene detection sample according to an embodiment of the present disclosure.
Figure 8:
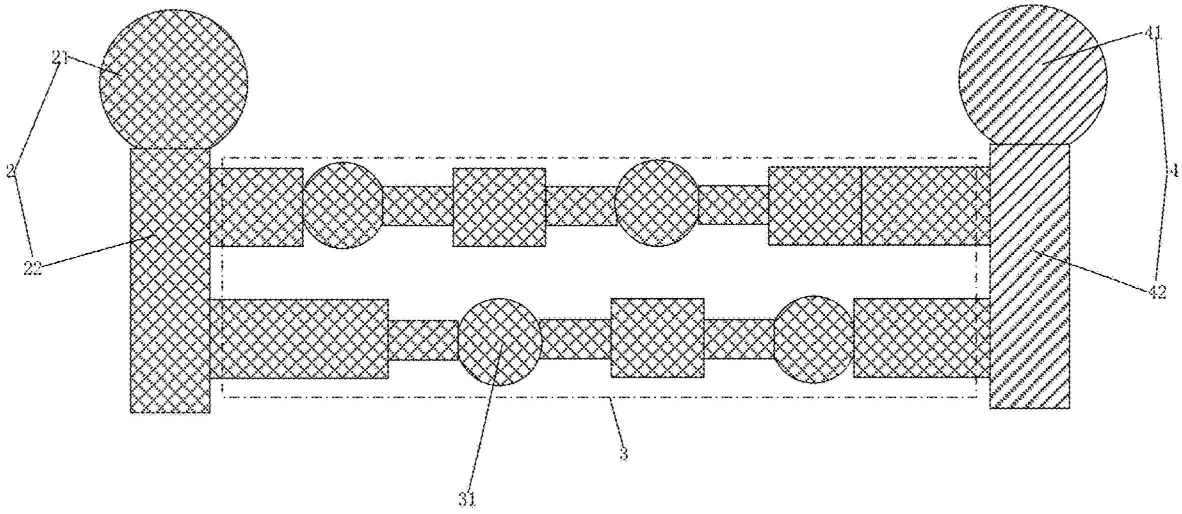
FIG. 8 is a schematic diagram illustrating a simulation effect of a sample injection of a gene detection chip according to an embodiment of the present disclosure.

In this embodiment, FIG. 7 is a schematic cross-sectional view of a partial structure of a prepared gene detection sample according to an embodiment of the present disclosure. FIG. 8 is a schematic diagram illustrating a simulation effect of a sample injection of a gene detection chip according to an embodiment of the present disclosure. The sample injection effect of the gene detection chip is simulated and verified by using the Ansys Fluent simulation software. As can be seen from FIG. 8, the sample injection groove 2 and the flow channel grooves 3 denoted by grids are filled with the sample reagent, and no bubbles exist in the sample injection groove 2 and the flow channel grooves 3; air exists in the sample outgoing groove 4 (particularly the sample outgoing hole 41) denoted by oblique lines. The verification result shows that the reaction holes 31 are filled with the sample reagent 7 after the sample injection of the gene detection channel in the gene detection chip is finished, and no bubbles are generated in the reaction holes 31, which shows that the effectiveness of the structural design of the gene detection channel in terms of the sample injection and the gas exhaust of the reaction holes 31.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A gene detection substrate, comprising:

a substrate; and a gene detection channel in the substrate, wherein an opening of the gene detection channel is on a side of the substrate, wherein the gene detection channel comprises a sample injection groove, a sample outgoing groove and a flow channel groove, and the sample injection groove, the flow channel groove and the sample outgoing groove are sequentially connected to each other and communicated with each other;

the flow channel groove comprises a plurality of reaction holes and a plurality of flow channel structures;

the plurality of reaction holes are distributed at intervals, and any two adjacent reaction holes are communicated with each other through the flow channel structure;

the flow channel structure comprises a first sub-groove, a second sub-groove and a third sub-groove, and the first sub-groove, the second sub-groove and the third sub-groove are sequentially connected to each other and communicated with each other;

a width of each of the first sub-groove and the third sub-grooves in a first direction is smaller than a width of the second sub-groove in the first direction; and the first direction is perpendicular to an arrangement direction of two adjacent reaction holes.

2. The gene detection substrate according to claim 1, wherein a depth of each of the first sub-groove and the third sub-groove is greater than a depth of the second sub-groove; and the depths of the first, second, and third sub-grooves are respective sizes of the first, second, and third sub-grooves in a thickness direction of the substrate.

3. The gene detection substrate according to claim 1, wherein the width of the second sub-groove in the first direction is smaller than a width of the reaction hole in the first direction.

4. The gene detection substrate according to claim 1, wherein the widths of the first sub-groove and the third sub-groove in the first direction are the same.

5. The gene detection substrate according to claim 2, wherein the depth of each of the first sub-groove and the third sub-groove is equal to a depth of the reaction hole; and the depth of the reaction hole is a size of the reaction hole in the thickness direction of the substrate.

6. The gene detection substrate according to claim 1, wherein the plurality of reaction holes and the plurality of flow channel structures are arranged along a second direction; the second direction is perpendicular to the first direction;

the flow channel groove further comprises a first end close to the sample injection groove and a second end close to the sample outgoing groove, and the flow channel groove further comprises a first branch groove and a second branch groove; the first branch groove is connected between the sample injection groove and a first reaction hole at the first end, and the sample injection groove is communicated with the first reaction hole through the first branch groove;

the second branch groove is connected between the sample outgoing groove and a second reaction hole at the second end; the first sub-groove and the second sub-groove are further connected between the second branch groove and the second reaction hole; the second reaction hole, the first sub-groove, the second sub-groove and the second branch groove are sequentially arranged along the second direction; and the sample outgoing groove is communicated with the second reaction hole through the second branch groove, the second sub-groove, and the first sub-groove.

7. The gene detection substrate according to claim 1, wherein a shape of an orthographic projection of the reaction hole on the substrate comprises a circle; and a shape of an orthographic projection of each of the first, second, and third sub-grooves on the substrate comprises a rectangle.

8. The gene detection substrate according to claim 7, wherein a diameter of the orthographic projection of the reaction hole on the substrate is in a range of 68 μm to 88 μm;

a depth of the reaction hole is in a range of 70 μm to 90 μm; and a depth of the second sub-groove is in a range of 20 μm to 40 μm.

9. The gene detection substrate according to claim 1, wherein a width of the first sub-groove in the first direction is in a range from 20 μm to 30 μm;

a width of the third sub-groove in the first direction is in a range from 20 μm to 30 μm; and a width of the second sub-groove in the first direction is in a range from 35 μm to 45 μm.

10. The gene detection substrate according to claim 6, wherein a length of the first sub-groove in the second direction is in a range from 10 μm to 20 μm;

a length of the third sub-groove in the second direction is in a range from 10 μm to 20 μm; and a length of the second sub-groove in the second direction is in a range from 25 μm to 35 μm.

11. The gene detection substrate according to claim 6, wherein a depth of each of the sample injection groove, the sample outgoing groove, the first branch groove, and the second branch groove is the same as a depth of the second sub-groove; and the depth of each of the sample injection groove, the sample outgoing groove, the first branch groove and the second branch groove is a size thereof along a thickness direction of the substrate.

12. The gene detection substrate according to claim 1, wherein the flow channel groove comprises a plurality of flow channel grooves;

the plurality of flow channel grooves are arranged in parallel with each other; and orthographic projections of the reaction holes in any two adjacent flow channel grooves on straight lines extending in the second direction are staggered distributed.

13. The gene detection substrate according to claim 12, wherein the reaction holes in each flow channel groove are arranged at equal intervals; and the reaction holes in the plurality of flow channel grooves are arranged in an array.

14. The gene detection substrate according to claim 1, wherein the side of the substrate from which the opening of the gene detection channel is formed comprises a first surface and a second surface;

the first surface is an inner wall of the gene detection channel, and a hydrophilic layer is provided on the first surface; and a hydrophobic layer is provided on the second surface.

15. The gene detection substrate according to claim 1, wherein the substrate is made of any one of polydimethylsiloxane, polymethyl methacrylate, and polycarbonate.

16. A gene detection chip, comprising the gene detection substrate according to claim 1 and an encapsulation film, wherein the encapsulation film and the gene detection substrate are aligned and assembled, so as to encapsulate the gene detection channel in the gene detection substrate.

17. The gene detection chip according to claim 16, wherein a region of the encapsulation film corresponding to the second sub-groove in the gene detection channel is attached and connected to an inner wall of the second sub-groove.

18. The gene detection chip according to claim 17, wherein the encapsulation film comprises a double-sided adhesive film or an ultraviolet curing adhesive film.

19. The gene detection chip according to claim 16, further comprising a plurality of the gene detection substrates, wherein the plurality of gene detection substrates are spliced together, and the gene detection channels in the plurality of gene detection substrates are separated from each other.

20. A method for preparing a gene detection sample, comprising:

preparing a gene detection substrate, wherein the gene detection substrate is the gene detection substrate of claim 1;

aligning and assembling an encapsulation film and the gene detection substrate, to form a gene detection chip;

injecting a sample reagent into the sample injection groove of the gene detection channel in the gene detection chip; and attaching and connecting a region of the encapsulation film corresponding to the second sub-groove in the gene detection channel to an inner wall of the second sub-groove when the gene detection channel is filled with the sample reagent, wherein the preparing the gene detection substrate comprises: preparing the gene detection channel on the substrate through a patterning process.

* * * * *